(12) United States Patent
Kuntze et al.

(10) Patent No.: US 12,522,058 B2
(45) Date of Patent: Jan. 13, 2026

(54) OVERMOLD BRACKET WITH OPEN MOUNTING SURFACE ON BRACKET

(71) Applicant: Magna Exteriors Inc., Concord (CA)

(72) Inventors: Christopher J. Kuntze, Goodrich, MI (US); Stanislav Tichy, Troy, MI (US); Gari Schalte, Auburn Hills, MI (US); Heiner Salzmann, Metamora, MI (US)

(73) Assignee: Magna Exteriors Inc., Aurora (CA)

( * ) Notice: Subject to any disclaimer, the term of this patent is extended or adjusted under 35 U.S.C. 154(b) by 387 days.

(21) Appl. No.: 17/919,416

(22) PCT Filed: Apr. 16, 2021

(86) PCT No.: PCT/US2021/027712
§ 371 (c)(1),
(2) Date: Oct. 17, 2022

(87) PCT Pub. No.: WO2021/211987
PCT Pub. Date: Oct. 21, 2021

(65) Prior Publication Data
US 2023/0158868 A1 May 25, 2023

Related U.S. Application Data

(60) Provisional application No. 63/011,596, filed on Apr. 17, 2020.

(51) Int. Cl.
*B60J 5/10* (2006.01)
*B29C 45/14* (2006.01)
(Continued)

(52) U.S. Cl.
CPC ......... *B60J 5/107* (2013.01); *B29C 45/14836* (2013.01); *B29K 2705/12* (2013.01); *B29L 2031/3005* (2013.01)

(58) Field of Classification Search
USPC .......................................................... 296/50
See application file for complete search history.

(56) References Cited

U.S. PATENT DOCUMENTS

| 6,012,735 A * | 1/2000 | Gray | B60R 21/215 |
| | | | 280/732 |
| 7,270,863 B2 * | 9/2007 | Harima | B60J 5/00 |
| | | | 428/45 |

(Continued)

FOREIGN PATENT DOCUMENTS

| CN | 209903794 U | * 1/2020 |
| EP | 3670274 A1 | 6/2020 |

(Continued)

OTHER PUBLICATIONS https://americanindust.com/industries/automotive/#:~:text=The%20process%20uses%20specialized%20dies, meet%20tight%20specifications%20and%20tolerances (Year: 2021).*

(Continued)

*Primary Examiner* — Joseph D. Pape
(74) *Attorney, Agent, or Firm* — Reising Ethington P.C.

(57) ABSTRACT

A liftgate (10) for a vehicle having at least one overmolding bracket (28) with at least one open mounting surface on the bracket for liftgate hardware attachments. In addition, overmolding the bracket (28) and maintaining at least one hole (26) for tether routing. The liftgate allows the overmolding of the bracket (28) and maintains a lower cost fastener joint that does not require extra components or special components such a compression limiters and rivet nuts or brackets that cannot be overmolded.

18 Claims, 8 Drawing Sheets

(51) Int. Cl.
    *B29K 705/12*    (2006.01)
    *B29L 31/30*     (2006.01)

(56) References Cited

U.S. PATENT DOCUMENTS

| | | |
|---|---|---|
| 10,589,605 B2 | 3/2020 | Imbert et al. |
| 2002/0167195 A1 | 11/2002 | Nagel et al. |
| 2020/0198448 A1* | 6/2020 | Coudron ................ B60J 5/044 |

FOREIGN PATENT DOCUMENTS

| WO | WO-2011095490 A2 * | 8/2011 | ............. B29C 33/20 |
|---|---|---|---|
| WO | 2018108252 A1 | 6/2018 | |

OTHER PUBLICATIONS https://sybridge.com/plastic-overmolding-materials/ (Year: 2021).*
International Search Report for PCT/US2021/027712 mailed Jul. 13, 2021, 2-pages.

\* cited by examiner

OVERMOLD BRACKET WITH OPEN MOUNTING SURFACE ON BRACKET

CROSS-REFERENCE TO RELATED APPLICATIONS

This application is a National Stage of PCT International Patent Application No. PCT/US2021/027712, filed Apr. 16, 2021 and claims the benefit of U.S. Provisional Patent Application No. 63/011,596, filed Apr. 17, 2020. The disclosures of the above applications are incorporated herein by reference.

FIELD OF THE INVENTION

The present invention relates to an overmold structure with at least one open mounting and/or routing surface on the structure and process for manufacturing same.

BACKGROUND OF THE INVENTION

Compression Limiters or rivet nuts are often used to help create a robust threaded fastener joint that would otherwise creep and loosen if a plastic panel would be compressed in a typical threaded fastener joint. Compression limiters and rivet nuts, however, add cost and complexity to a design and to the assembly process. Conventional designs and methods have used mechanical fasteners like compression limiters, and rivet nuts or/and brackets that may not be over molded. These cause problems with packaging, space, cost, complexity and quality, etc.

Thus, it is an objective of the present invention to eliminate the need for compression limiters or rivet nuts to reduce complexity, reduce cost, reduce possibility of poor assembly, reduce assembly time, reduce weight, etc.

Another known problem is that tethers are often times used on items such as thermoplastic ("TP") Liftgates, and attachments can add extra costs and assembly time and complexity. Some conventional designs use mechanical fasteners and brackets that do not get over molded.

Thus, it is an objective of the present invention to maintain the overmolding of bracket advantage, and maintain an open hole for tether routing to reduce complexity, reduce cost, reduce possibility of poor assembly, reduce assembly time, reduce weight, etc.

SUMMARY OF THE INVENTION

The present invention eliminates the need for compression limiters or rivet nuts to reduce complexity, reduce cost, reduce possibility of poor assembly, reduce assembly time, reduce weight, etc.

This invention allows the overmolding of the bracket and maintains a lower cost fastener joint that does not require extra components or special components.

The injection mold protects and maintains an opening through the molding operation, and, optionally, through open to die tip tool direction, or through tool action such as a lifter, and this open surface is the mounting surface for items such as hinges, ball stud, bracket, etc.

Preferably, the bracket mounting surface is maintained through the over molding process.

In addition, according to aspects of the present invention putting holes in metallic reinforcements for tether routing creates a more efficient design. Overmolding metallic brackets creates an efficient method of combining the bracket and molded panel; thus, overmolding the bracket and maintaining the hole for tether routing creates an even more efficient and cost-effective design.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring to FIGS. 1-6 generally, there is illustrated an exemplary liftgate assembly indicated generally at 10, including an overmold bracket with at least one mounting surface on the bracket and method for making same, in accordance with the present invention. There is provided at least one overmold bracket with at least one open mounting surface on the bracket. The open mounting surface on the bracket can provide for at least one thermoplastic liftgate hardware attachment.

Figure 1:
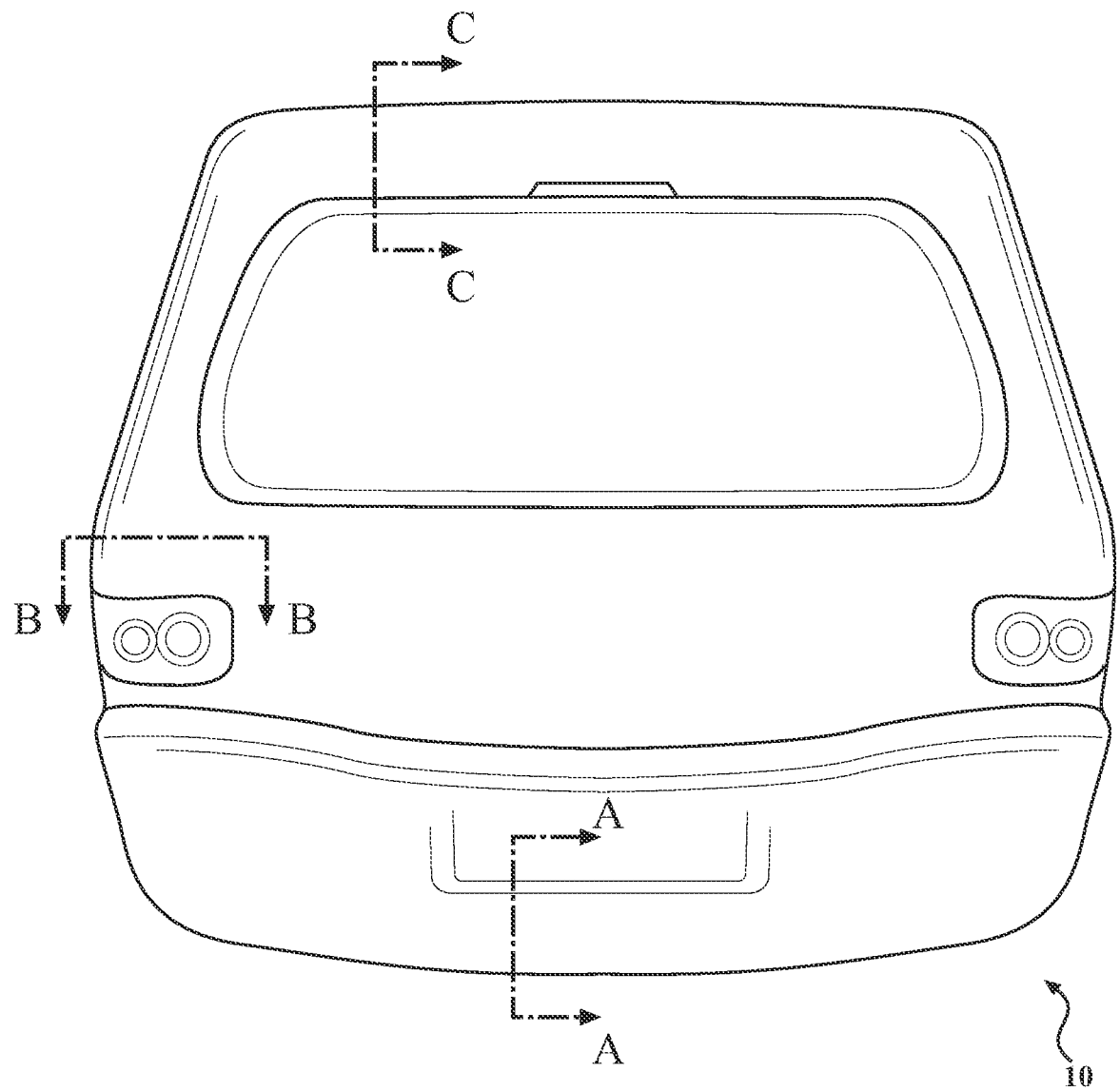
FIG. 1 is a rear elevation view of an exemplary liftgate assembly, in accordance with aspects of the present invention.
Figure 2:
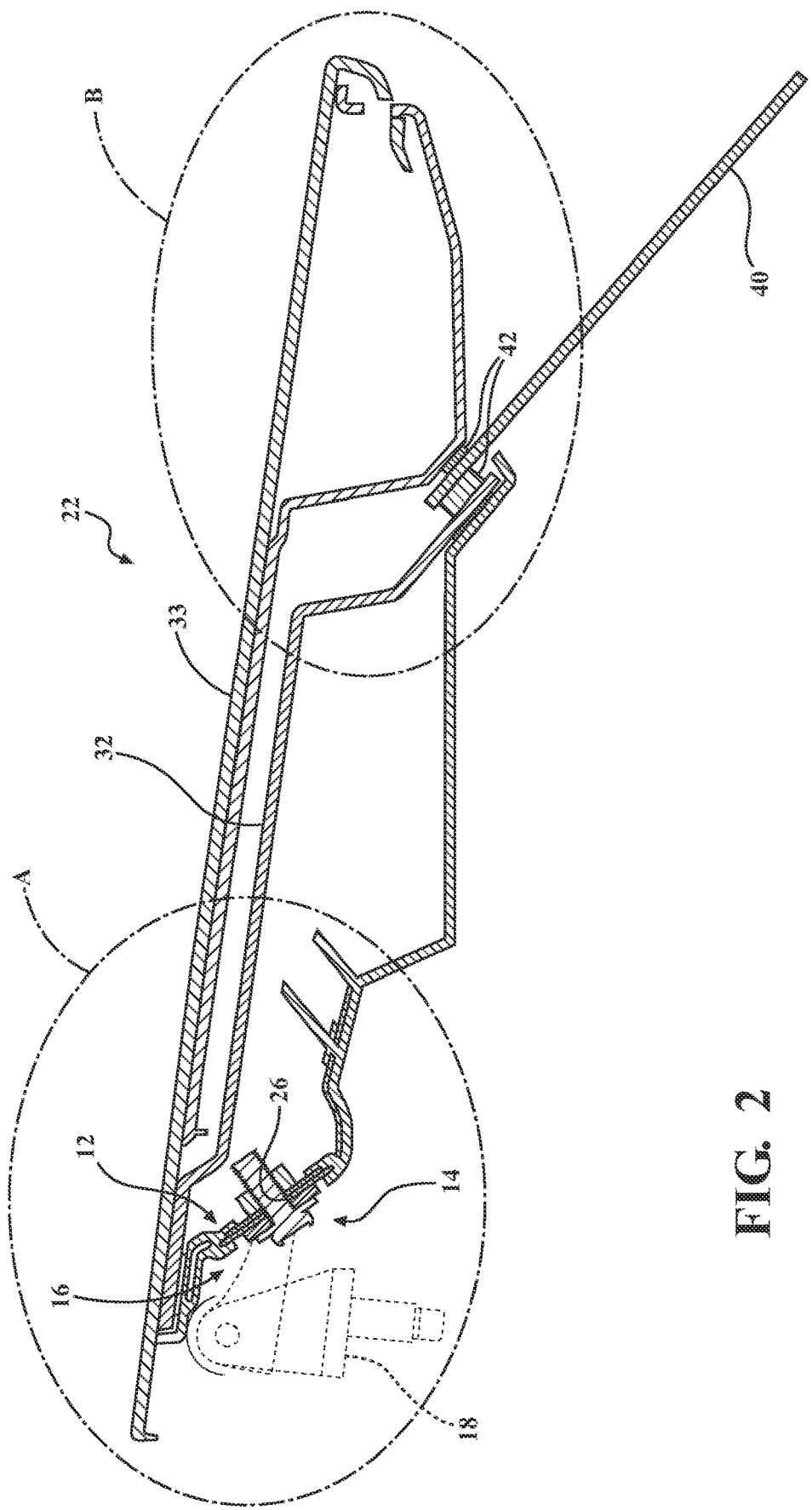
FIG. 2 is a cross section taken at C-C of FIG. 1, in accordance with the present invention.
Figure 3:
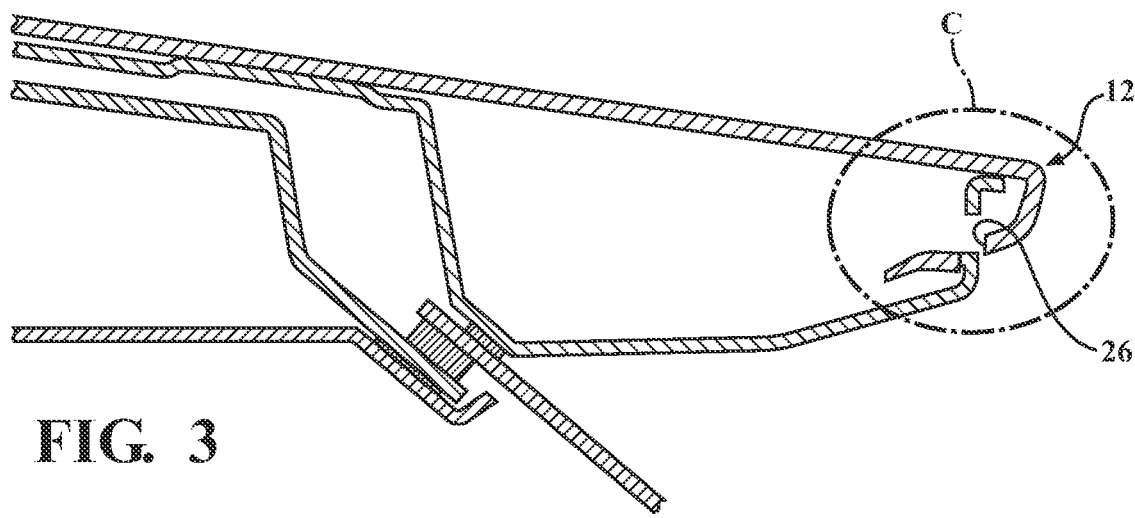
FIG. 3 is an enlarged cross section taken at 'B' of FIG. 2, in accordance with the present invention.
Figure 4:
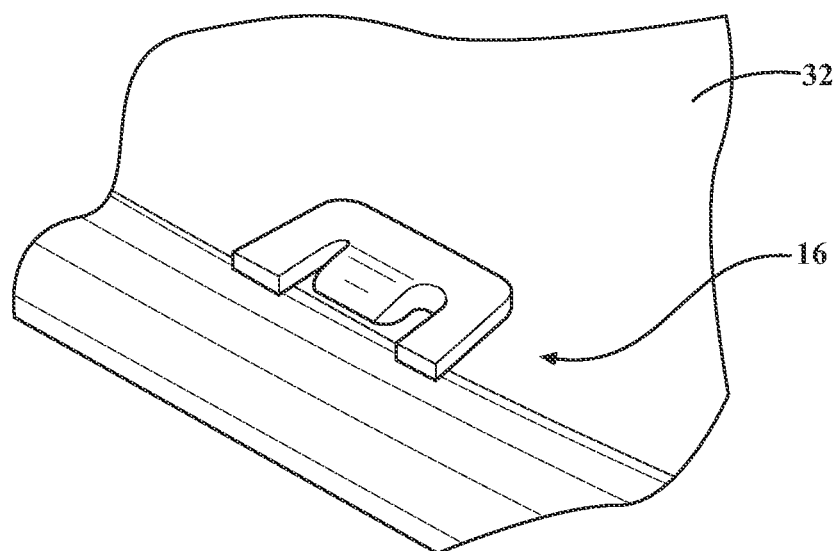
FIG. 4 is an enlarged view taken at 'C' of FIG. 3 including a hinge, according to aspects of the present invention.
Figure 5:
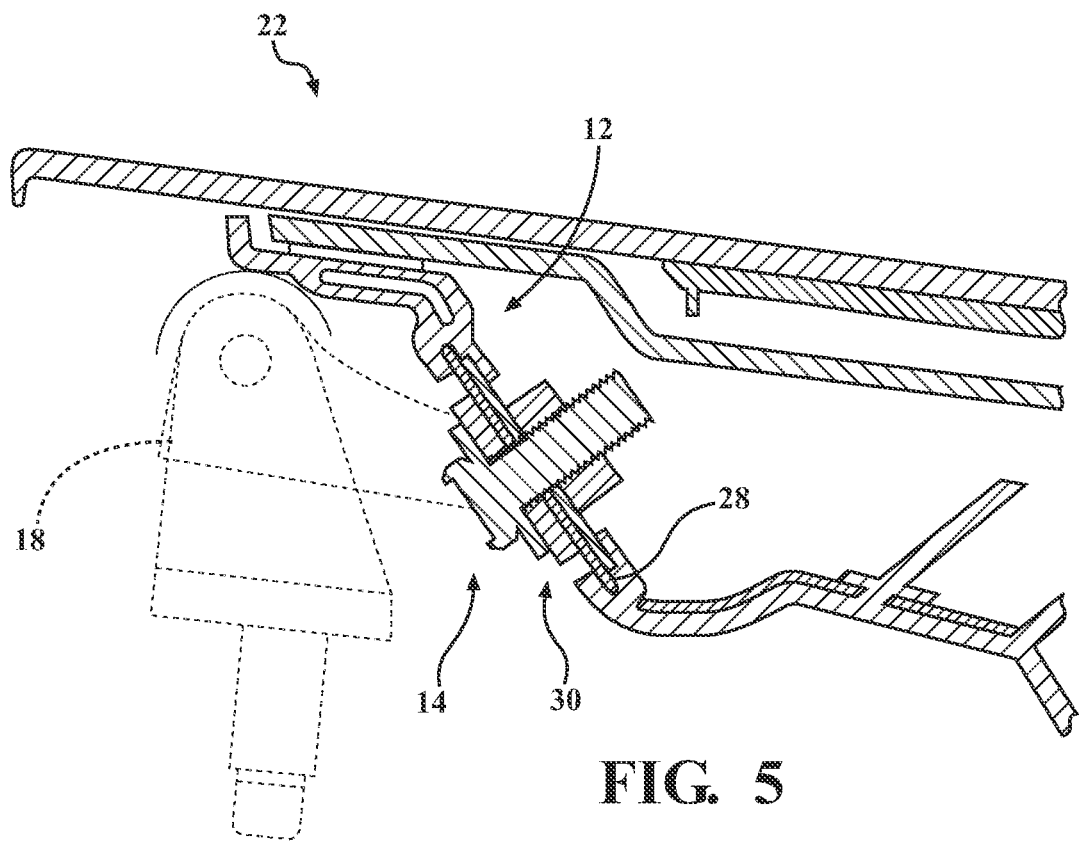
FIG. 5 is an enlarged cross section at 'A' of FIG. 2, including a hinge area environment of use, according to aspects of the present invention.

FIGS. 2-5 depict a cross section at a hinge area taken at C-C of FIG. 1, e.g., at least one of a pair of oppositely-disposed hinge portions. By way non-limiting examples, a liftgate hinge, rear window hinge, etc.

Figure 6:
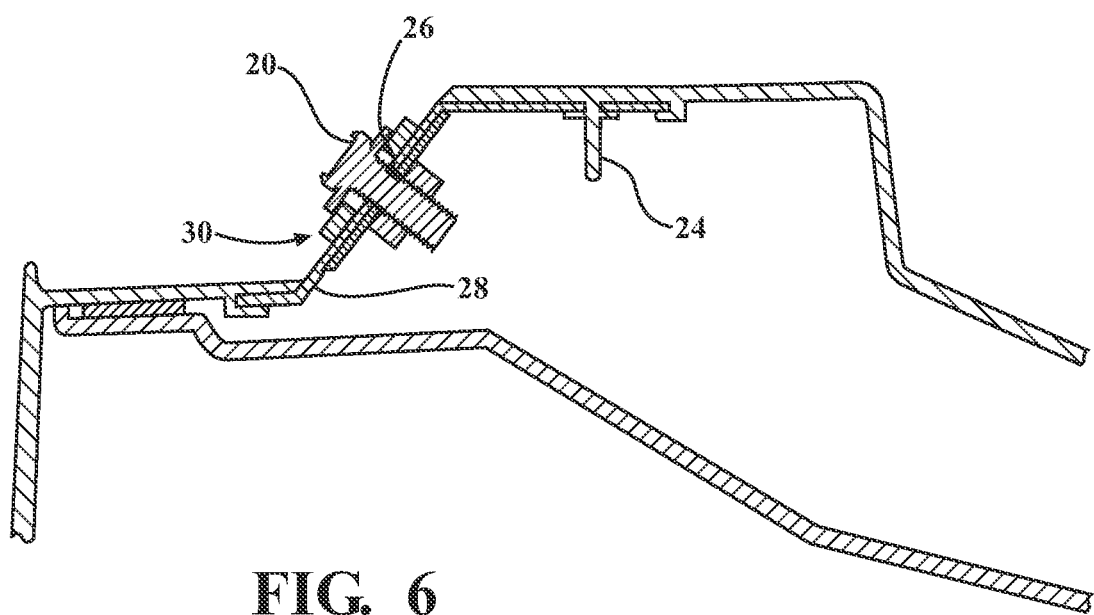
FIG. 6 is a cross section taken at 'B-B' of FIG. 1, including a ball stud attachment environment of use, in accordance with the present invention.
Figure 7:
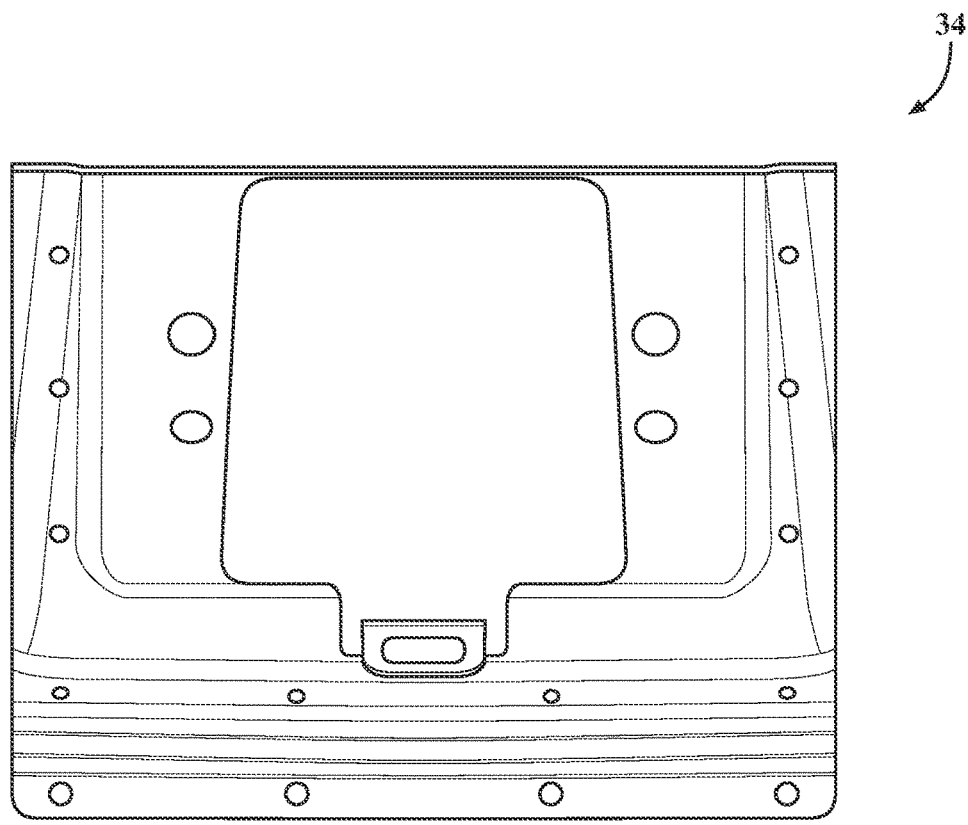
FIG. 7 is a top plane view of a bracket, according to aspects of the present invention.
Figure 8:
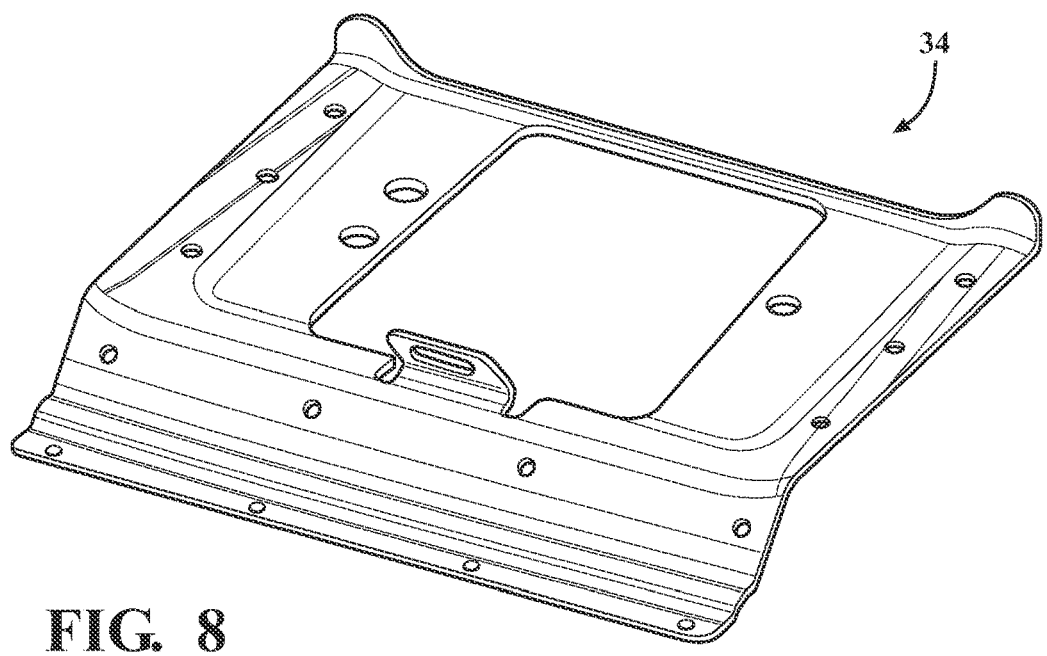
FIG. 8 is a perspective view of the bracket of FIG. 7.
Figure 9:
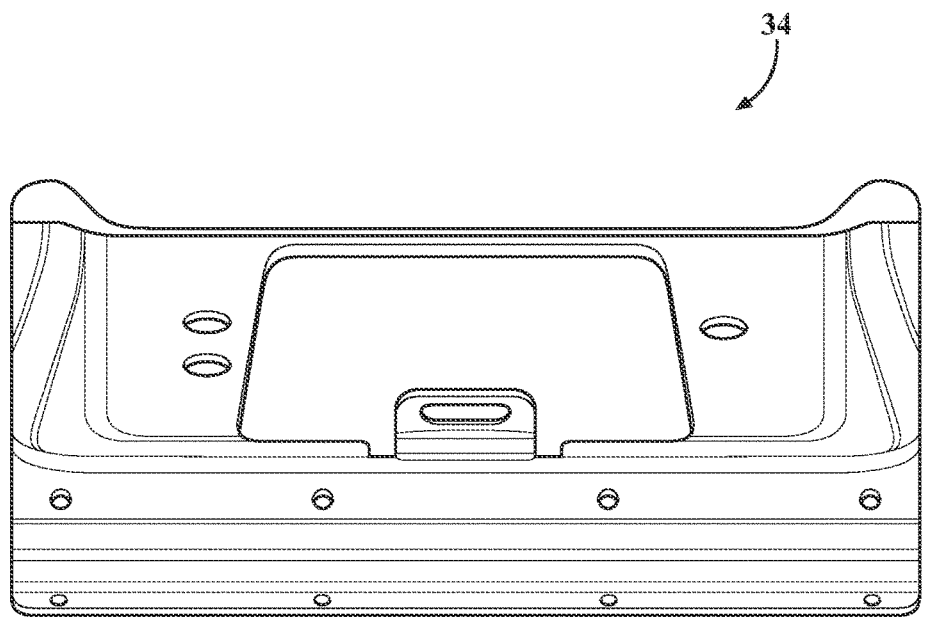
FIG. 9 is a perspective view of the bracket of FIG. 7.
Figure 10:
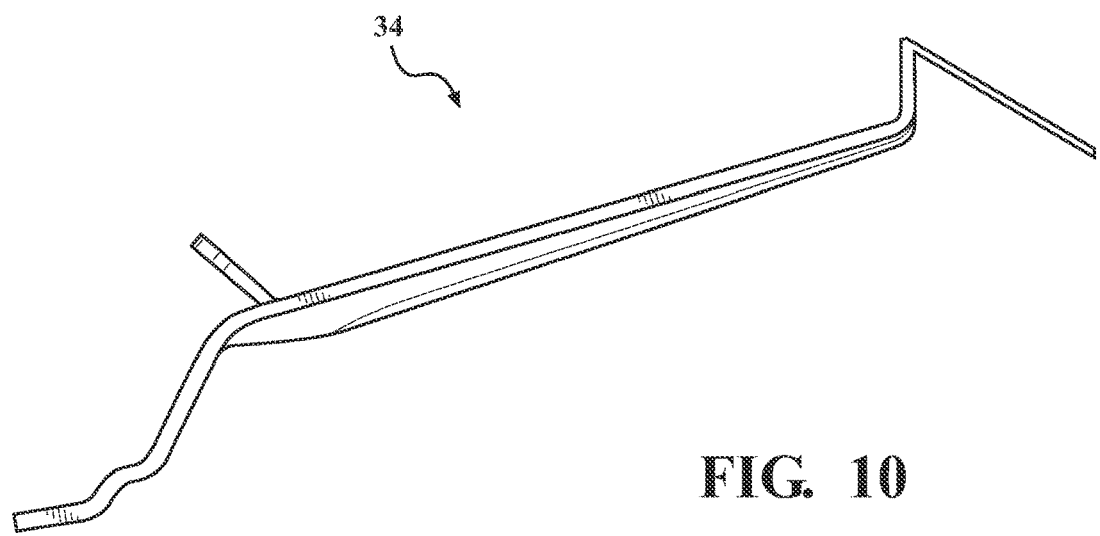
FIG. 10 is a side elevation view of the bracket of FIG. 7.
Figure 11:
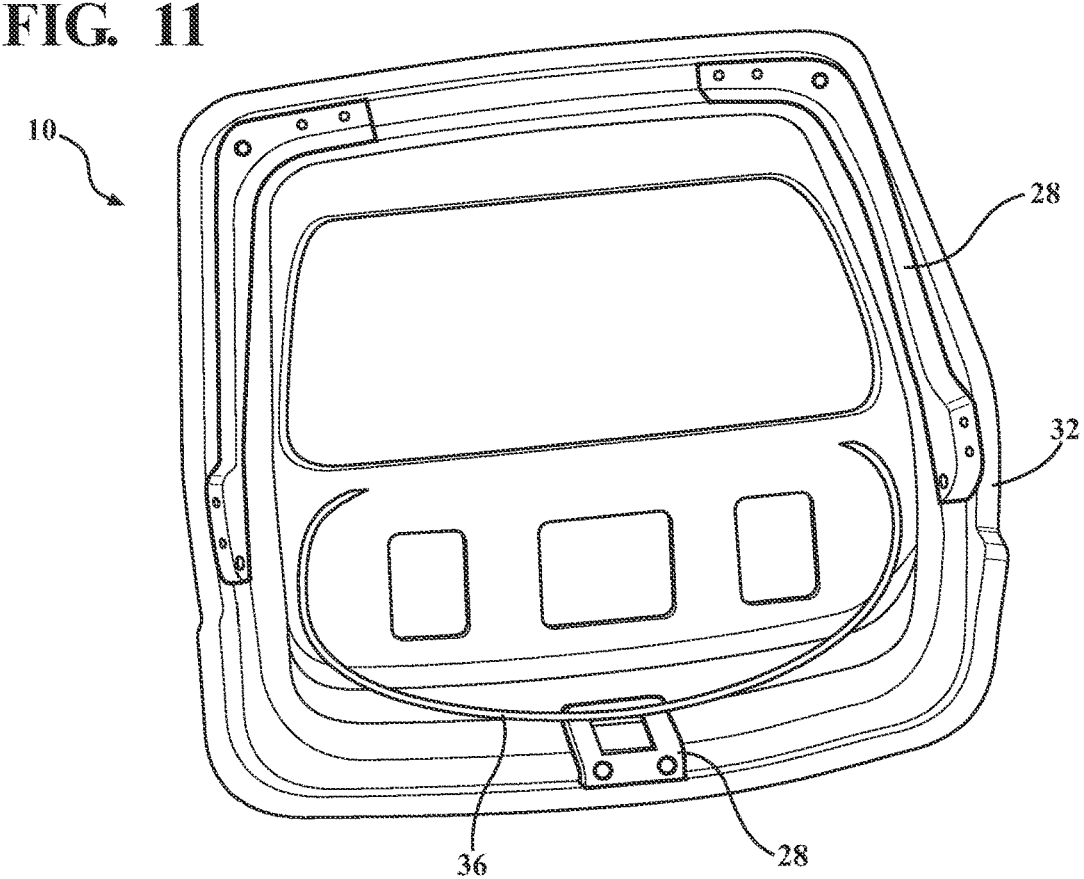
FIG. 11 is a perspective view of an exemplary liftgate panel, including at least one tether, in accordance with the present invention.
Figure 12:
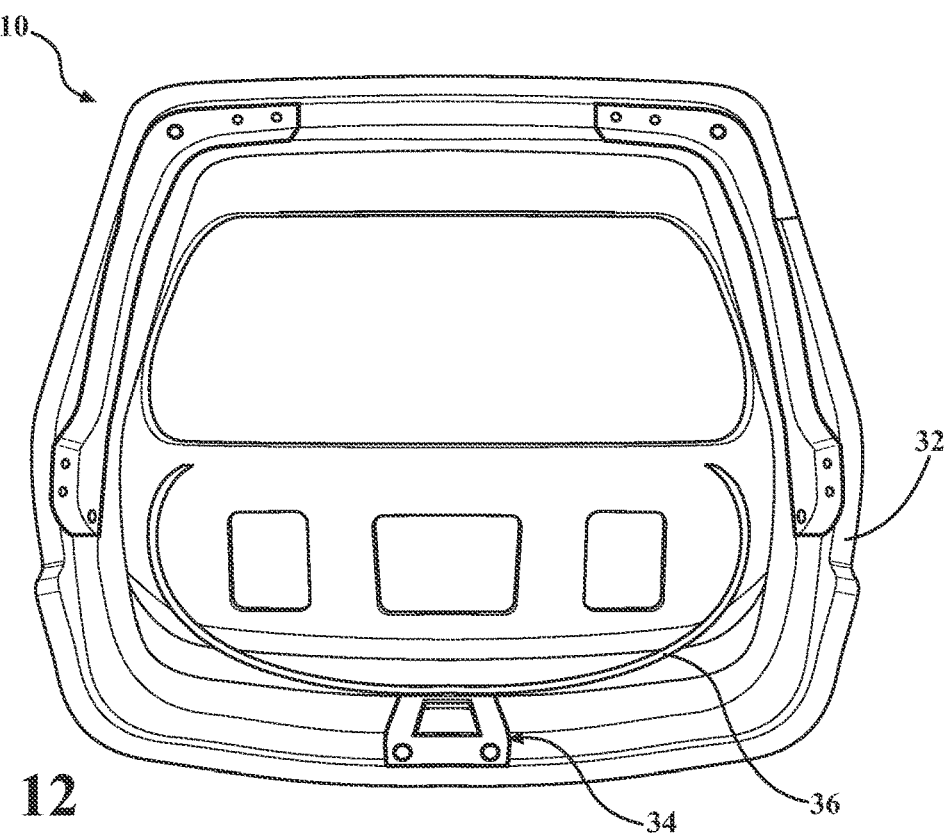
FIG. 12 is a rear elevation view of an exemplary liftgate panel, including exemplary tether routing placement in an environment of use, in accordance with the present invention.
Figure 13:
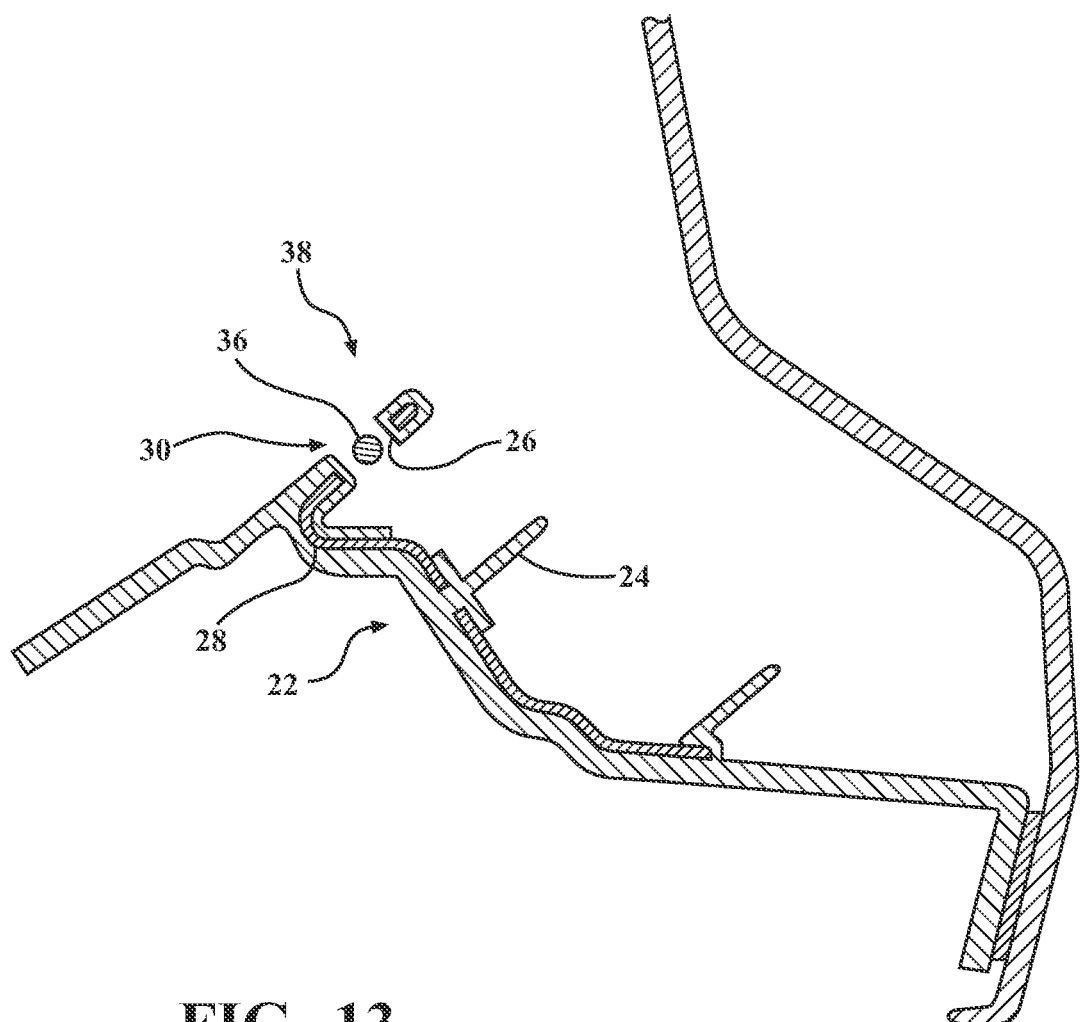
FIG. 13 is a cross section taken at 'A-A' of FIG. 1, depicting a tether routing aperture with an overmolded bracket, in accordance with the present invention.

FIG. 6 depicts a cross-section taken at B-B of FIG. 1 at a ball stud attachment, e.g., one of oppositely-disposed bottom corner regions of a rear window, with a ball stud attachment depicted generally at 20.

Referring more particularly to FIGS. 2-5, there is provided overmold and maintaining of an open footprint for direct hardware attachment. One benefit is a lower cost liftgate. Generally, the present invention overmolds and maintains a predetermined open footprint. Typically, the overmold portion, indicated generally at 12 is provided and an open footprint maintained, indicated generally at 14, for direct hardware attachment, indicated generally at 16, e.g., hinge 18, ball stud 20, hat bracket, latch fasteners, and any other bracket-type mounting, without the added costs that would be associated with rivet nuts or compression limiters, which the present invention eliminates, in accordance with aspects of the present invention. Optionally, weld nuts 24 (e.g., see FIG. 6) can be used as needed and included with the overmolding bracket sub assembly; the overmolded bracket sub-assembly indicated generally at 22. Preferably, at least one aperture 26 is provided through at least one bracket 28, e.g., that is a latch bracket such as indicated generally at 34, and overmold indicated generally at 30, for operably connecting at least one attachment 16, e.g., hinge, ball stud, hat bracket, latch fastener, and any other bracket type mounting, without the added cost of rivet nuts or compression limiters, and/or operably connecting at least one attachment that is a tether 36, etc. The at least one aperture 26 can, by way of non-limiting example, be an opening. The at least one aperture 26 can, by way of non-limiting example, be a hole.

Referring generally to FIGS. 1-13, according to aspects of the present invention, at least one injection mold protects and maintains the at least one aperture 26 throughout the molding operation, e.g., at least one liftgate panel 32 molding, and, preferably, through open to die tip tool direction, or through a tool action such as a lifter, or any other suitable process, and this open surface is the mounting surface for items such as hinges, ball stud, bracket, etc. and any combinations thereof. The present invention operably maintains the predetermined bracket mounting surface through the predetermined over molding process.

The present invention allows the overmolding of the at least one bracket 28 and maintains a lower cost fastener joint that does not require extra components or special components. Thus, the present invention eliminates the need for mechanical fasteners such as compression limiters or rivet nuts to thereby reduce complexity, reduce cost, reduce possibility of poor assembly, reduce assembly time, reduce weight.

The at least one overmold bracket 28 is selected from the group consisting of: at least one latch plate, at least one liftgate striker, at least one D-Pillar reinforcement, at least one shock plate, at least one strut plate, at least one hinge plate, at least one upper horizontal reinforcement, at least one side reinforcement, at least one vertical reinforcement, at least one corner liftgate reinforcement, at least one metal bracket, at least one steel bracket, at least one fiber reinforced molded bracket, and any combinations thereof.

The at least one predetermined liftgate attachment 16 is selected from the group consisting of: at least one hinge, ball stud, hat bracket, latch fasteners, weld nuts, bracket mounting, tether, and any combination thereof.

Referring more particularly to FIGS. 6-13 generally, there is illustrated an exemplary liftgate assembly indicated generally at 10, including an overmold 30 and at least one aperture 26 maintained for tether routing. There is provided at least one aperture (e.g., opening or hole) in at least one overmolded bracket 28, e.g, reinforcement bracket, metal bracket, fiber reinforced bracket, etc. In accordance with aspects of the present invention, there is provided the creating of at least one aperture 26, preferably, a plurality of holes, in at least one reinforcing bracket 28 for low cost tether routing of at least one tether 36 and maintaining the aperture 26 even with the bracket 28 over molding. At least one open mounting surface is provided. Preferably, a flange portion, indicated generally at 38, has at least one overmolded bracket 28. The over mold flange is provided and predetermined tool action produces the at least one aperture 26. Optionally, a secondary operation produces at least one aperture 26, if required. Optionally, at least one additional tether is provided or at least one opening created and maintained for at least one wire harnesses routing, substantially as set forth previously.

Referring to FIGS. 1-13 generally, according to aspects of the present invention, there is created at least one aperture 26 in the stamping that is maintained in the molding operation, and, alternatively, through tool action such as a lifter, and/or at least one aperture is added post overmolding, as a secondary operation. The at least one aperture 26 (e.g., hold, opening, slit, etc) is maintained for tether 36 routing with the over molding process.

Putting apertures 26 in metallic reinforcements for tether routing creates a more efficient design. Overmolding metallic brackets creates an efficient method of combining the bracket 28 and molded liftgate panel; thus, overmolding the bracket and maintaining the aperture for tether routing creates an even more efficient and cost effective design.

The present invention maintains the overmolding of bracket advantage, and maintains an open aperture for tether routing. Thus, the present invention reduces complexity, costs, the chances of poor assembly and is more efficient and cost effective.

The liftgate 10 includes at least one panel 32, preferably, at least one inner panel 32 and at least one outer panel 33, most preferably at least one inner panel, at least one upper outer panel with show, Class-A surface, and at least one lower outer panel with show, Class-A surface. The liftgate is adapted to couple a rear window 40, e.g., by adhesive 42. The panel(s) 32 are predetermined materials suitable for strength and weight considerations, etc, e.g., composite, SMC, sheet metal composition, thermoplastic, etc. The reinforcements are preferably metal, e.g., steel, but any other suitable materials are contemplated, e.g., lighter weight metals, aluminum, plastics, carbon reinforced thermoplastics, etc. and any combinations thereof, depending on the application without departure from the present invention.

It is understood that while the present invention is adapted for a liftgate assembly as shown, the present invention is adaptable for any alternative assembly, e.g., door assembly, tailgate assembly, bumber, fender, roof top, rocker panel, etc, depending on the application without departure from the scope of the present invention. It is understood that the bracket is adaptable for attachment to any predetermined part, e.g., reinforcement, strut bracket, hinge bracket, plate bracket, pillar reinforcement, or any other part and combinations thereof, etc., depending on the application without departure from the scope of the present invention. While a metallic reinforcement is described it is understood that any alternative suitable material is contemplated, e.g., metal, reinforced composite, etc., is contemplated depending on the application without departure from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A liftgate assembly for a vehicle, comprising:
   at least one liftgate panel including at least one reinforcement area;
   at least one overmolded bracket with at least one open mounting surface at at least one predetermined location adapted to selectively operably connect at least one predetermined liftgate attachments;
   at least one aperture maintained through said at least one overmolded bracket adapted to selectively operably connect said at least one predetermined liftgate attachments; and
   at least one tether routed through said at least one aperture.

2. The liftgate assembly of claim 1, wherein the at least one overmolded bracket includes a flange that is overmolded and tool action produces the at least one aperture through the overmolded flange adapted for tether routing.

3. The liftgate assembly of claim 1, wherein the at least one predetermined liftgate attachment is selected from the group consisting of: at least one hinge, ball stud, hat bracket, latch fasteners, weld nuts, bracket mounting, and any combination thereof.

4. The liftgate assembly of claim 1, wherein compression limiters are not used, and rivet nuts are not used.

5. The liftgate assembly of claim 1, further comprising at least one tether routed through said at least one aperture.

6. A liftgate assembly for a vehicle, comprising:
   at least one liftgate panel including at least one reinforcement area;
   at least one overmolded bracket with at least one open mounting surface at at least one predetermined location adapted to selectively operably connect at least one predetermined liftgate attachments;
   at least one aperture maintained through said at least one overmolded bracket adapted to selectively operably connect said at least one predetermined liftgate attachments; and
   at least one additional overmolded bracket with at least one additional aperture maintained through said at least one overmolded bracket during overmolding, wherein at least one tether is routed through said at least one aperture of said overmolded bracket and/or said at least one tether is routed through said at least one additional aperture of said at least one additional overmolded bracket.

7. The liftgate assembly of claim 1, wherein the overmolded bracket and a maintained open footprint is adapted for selectively operably attaching the predetermined at least one liftgate attachment without the use of compression limiters or rivet nuts.

8. The liftgate assembly of claim 1, wherein the at least one overmolded bracket is selected from the group consisting of: at least one latch plate, at least one liftgate striker, at least one D-Pillar reinforcement, at least one shock plate, at least one strut plate, at least one hinge plate, at least one upper horizontal reinforcement, at least one side reinforcement, at least one vertical reinforcement, at least one corner liftgate reinforcement, at least one metal bracket, at least one steel bracket, at least one fiber reinforced molded bracket, and any combinations thereof.

9. A method of manufacturing a liftgate assembly, comprising:
   providing an injection mold;
   providing at least one bracket with at least one open mounting surface;
   forming at least one hole through said at least one bracket adapted to connect at least one predetermined liftgate attachments;
   molding at least one liftgate panel;
   overmolding said at least one bracket while operably maintaining said at least hole;
   providing at least one tether, said at least one tether routed through said at least one hole; and
   connecting said at least one predetermined liftgate attachments.

10. The method of manufacturing a liftgate assembly of claim 9, wherein the predetermined at least one attachment is selected from the group consisting of at least one hinge, ball stud, hat bracket, latch fasteners, weld nuts, bracket mounting and combinations thereof.

11. The method of manufacturing a liftgate assembly of claim 9, wherein the injection mold operably protects and maintains the at least one hole through the molding operation.

12. The method of manufacturing a liftgate assembly of claim 9, wherein the injection mold operably protects and maintains the at least one hole through open to die tip tool direction.

13. The method of manufacturing a liftgate assembly of claim 9, wherein the injection mold operably protects and maintains the at least one hole through tool action of a lifter.

14. The method of manufacturing a liftgate assembly of claim 9, wherein the open surface is the mounting surface for items selected from the group consisting of hinges, ball stud, and brackets and combinations thereof.

15. The method of manufacturing a liftgate assembly of claim 9, wherein the process allows the overmolding of the at least one bracket and maintains a lower cost fastener joint that does not require extra components or special components.

16. The method of manufacturing a liftgate assembly of claim 9, wherein compression limiters and rivet nuts are not used.

17. The method of manufacturing a liftgate assembly of claim 9, wherein providing the at least one bracket includes stamping the bracket and creating the at least one hole in the stamping that is operably maintained in the molding operation.

18. The method of manufacturing a liftgate assembly of claim 9, further comprising a secondary operation creating at least one hole after overmolding of the at least one bracket, said at least one hole operable for tether routing.

* * * * *